United States Patent
Matsuura

(10) Patent No.: US 8,116,560 B2
(45) Date of Patent: Feb. 14, 2012

(54) COLOR PROCESSING METHOD AND APPARATUS

(75) Inventor: Takahiro Matsuura, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 12/125,779

(22) Filed: May 22, 2008

(65) Prior Publication Data

US 2008/0298676 A1 Dec. 4, 2008

(30) Foreign Application Priority Data

May 28, 2007 (JP) ................................ 2007-140565

(51) Int. Cl.
*G06K 9/00* (2006.01)
(52) U.S. Cl. ..................................................... 382/162
(58) Field of Classification Search .......... 382/162–167; 358/1.9, 504, 518–539; 702/85; 345/589–604
See application file for complete search history.

(56) References Cited

U.S. PATENT DOCUMENTS

| 7,069,164 | B2 * | 6/2006 | Viturro et al. .................... 702/85 |
| 7,081,899 | B2 * | 7/2006 | Shimazaki et al. ........... 345/590 |
| 7,307,752 | B1 * | 12/2007 | Mestha et al. ................. 358/1.9 |
| 7,751,618 | B2 * | 7/2010 | Matsuura ....................... 382/167 |
| 7,893,966 | B2 * | 2/2011 | Yoshida ...................... 348/222.1 |

FOREIGN PATENT DOCUMENTS

| JP | 02-248163 A | 10/1990 |
| JP | 2004-341923 A | 12/2004 |
| JP | 2005-045446 A | 2/2005 |
| JP | 2005-110089 A | 4/2005 |

* cited by examiner

*Primary Examiner* — Ishrat I Sherali
(74) *Attorney, Agent, or Firm* — Canon U.S.A., Inc., I.P. Division

(57) ABSTRACT

A method for generating a color processing parameter used in color processing performed on an image captured by an imaging unit includes inputting data of an image captured by the imaging unit, inputting target data corresponding to the data, generating a pair of data and target data based on the data and the target data, and generating a color processing parameter for converting the data to the target data.

6 Claims, 10 Drawing Sheets

COLOR PROCESSING METHOD AND APPARATUS

BACKGROUND OF THE INVENTION

1. Field of the Invention

The present invention relates to generating color processing parameters.

2. Description of the Related Art

In conventional digital cameras, a plurality of color processing parameters are pre-stored inside the digital camera, and color processing of captured image data is carried out by selecting one of those parameters and using the color processing parameter corresponding to a selected mode.

However, in conventional digital cameras, only pre-arranged modes can be set. Color reproduction of user's preferences cannot be implemented.

Accordingly, Japanese Patent Application Laid-Open No. 2004-341923 discusses a color processing parameter customization apparatus in which color reproduction can be freely set for a digital camera according to user's preferences.

In this color processing parameter customization apparatus, a color processing parameter can be determined which enables captured image data obtained when a color chart including skin color, sky color, grass color, primary colors and the like is captured by a digital camera to be brought closer to the color of user's preferences (target data).

However, in this color processing parameter customization apparatus, while good color reproduction can be performed for colors within the color gamut that is reproducible with the color chart, colors that are outside of the color gamut of the color chart may not be reproduced well, so that accuracy deteriorates. In this respect, there is room for improvement.

This problem has arisen for colors falling outside the color gamut of the color chart due to the fact that the color gamut of a digital camera is usually greater than the color gamut of the color chart.

SUMMARY OF THE INVENTION

The present invention is directed to enabling good reproduction even of colors falling outside of the color gamut of a color chart by accurately estimating colors that fall outside of the color gamut of the color chart and adding the estimated colors as target data during optimization.

According to an aspect of the present invention, a method is provided for generating a color processing parameter used in color processing performed on an image captured by an imaging unit. The method includes inputting data of an image captured by the imaging unit, inputting target data corresponding to the data, generating a pair of data and target data based on the data and the target data, and generating a color processing parameter for converting the data into the target data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
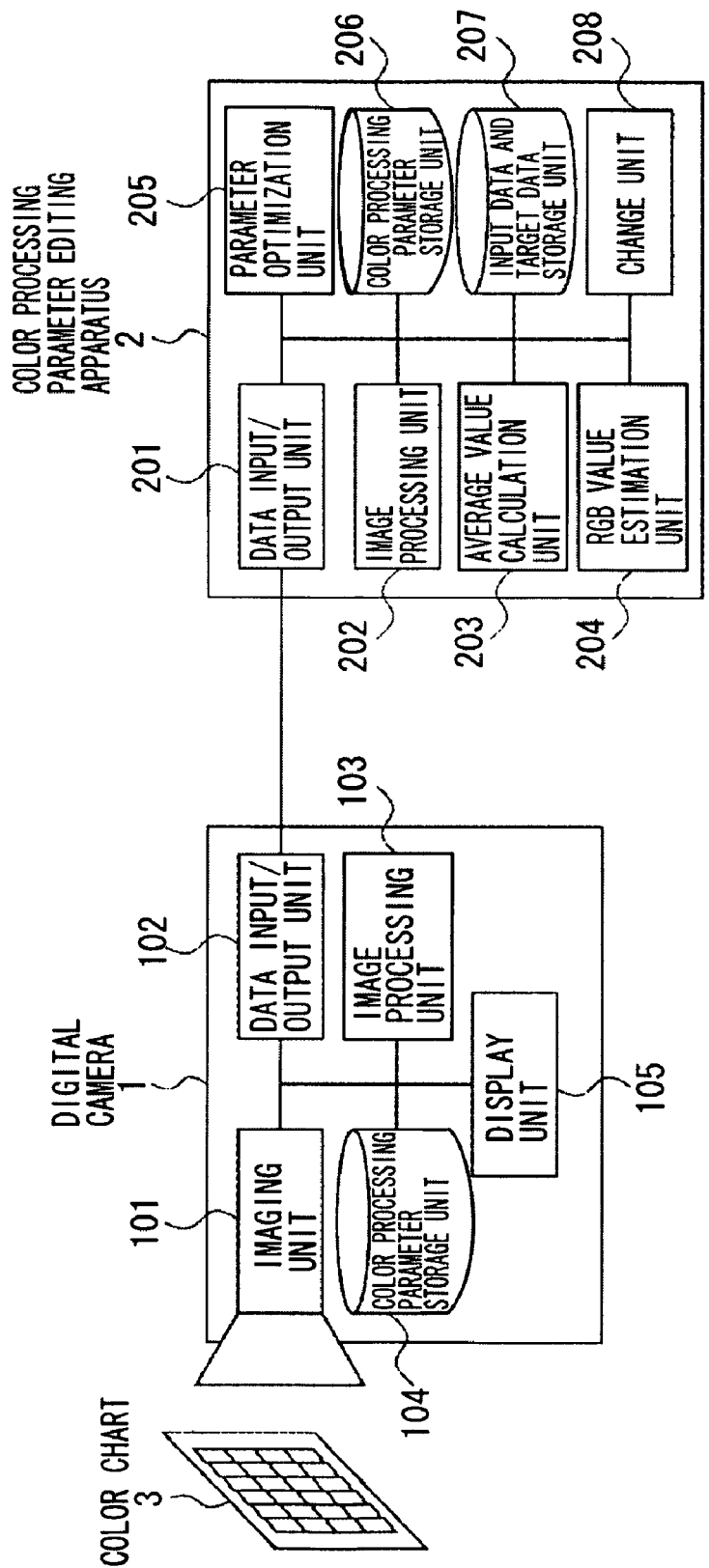
FIG. 1 is a diagram illustrating a configuration of a system according to an exemplary embodiment of the present invention.

FIG. 1 illustrates a configuration of a system according to an exemplary embodiment of the present invention.

In FIG. 1, the system includes a digital camera 1, a color processing parameter editing apparatus 2, and a color chart 3.

An imaging unit 101 includes a photographic lens and an image sensor, such as a charge-coupled device (CCD). A data input/output unit 102 serves as an interface that communicates image data and color processing parameters with external devices. An image processing unit 103 performs processing on an object image acquired by the imaging unit 101 using color processing parameters stored in a color processing parameter storage unit 104 to form image data. The color processing parameter storage unit 104 stores color processing parameters. A display unit 105, such as a liquid crystal display, displays an image being captured.

A data input/output unit 201 serves as an interface that communicates image data, color processing parameters, and target data with external devices. An image processing unit 202 performs processing on an object image acquired by the imaging unit 101 using color processing parameters stored in a color processing parameter storage unit 206 to form image data. An average value calculation unit 203 calculates RGB average values of respective patches of image data input from the data input/output unit 201.

An RGB value estimation unit 204 estimates RGB values of image data obtained when an image of a patch having arbitrary spectral characteristics is captured using input data and target data stored in an input data and target data storage unit 207. Further, the RGB value estimation unit 204 stores the estimated RGB values in the input data and target data storage unit 207 along with XYZ values or Lab values of arbitrary spectral characteristics.

A parameter optimization unit 205 optimizes the color processing parameters stored in the color processing parameter storage unit 206 using, for example, a Dumped Least Squares (DLS) algorithm.

The color processing parameter storage unit 206 stores the color processing parameters of the digital camera 1. The input data and target data storage unit 207 stores input data and target data. A change unit 208 displays data plotting input image data and target data on an a*b* plane of a color space defined by CIELAB so that the target data can be changed to a desired color via a user interface (UI) as required.

First, during image capture, the user switches a power switch (not shown) on, and then an image to be displayed is generated by the image processing unit 103 from image data acquired via the imaging unit 101 using a parameter stored in the color processing parameter storage unit 104. The generated image is simultaneously displayed on the display unit 105. The user views an image displayed on the display unit 105, decides the camera composition, and presses a shutter button (not shown) to capture an image.

Once the shutter button is pressed, the image processing unit 103 acquires image data from the imaging unit 101 and performs processing on the acquired image data for color, brightness, and the like using a parameter stored in the color processing parameter storage unit 104. The resultant image data is output from the data input/output unit 102. At this stage, the data can be output directly to the color processing parameter editing apparatus 2 via a cable, or can be output to a recording medium, such as CompactFlash®. Also at this stage, if the parameter is set in the color processing parameter storage unit 104 so that image data acquired from the imaging unit 101 is output as is to the data input/output unit 102, a user can obtain image data that is acquired via the imaging unit 101 without being processed.

Figure 2:
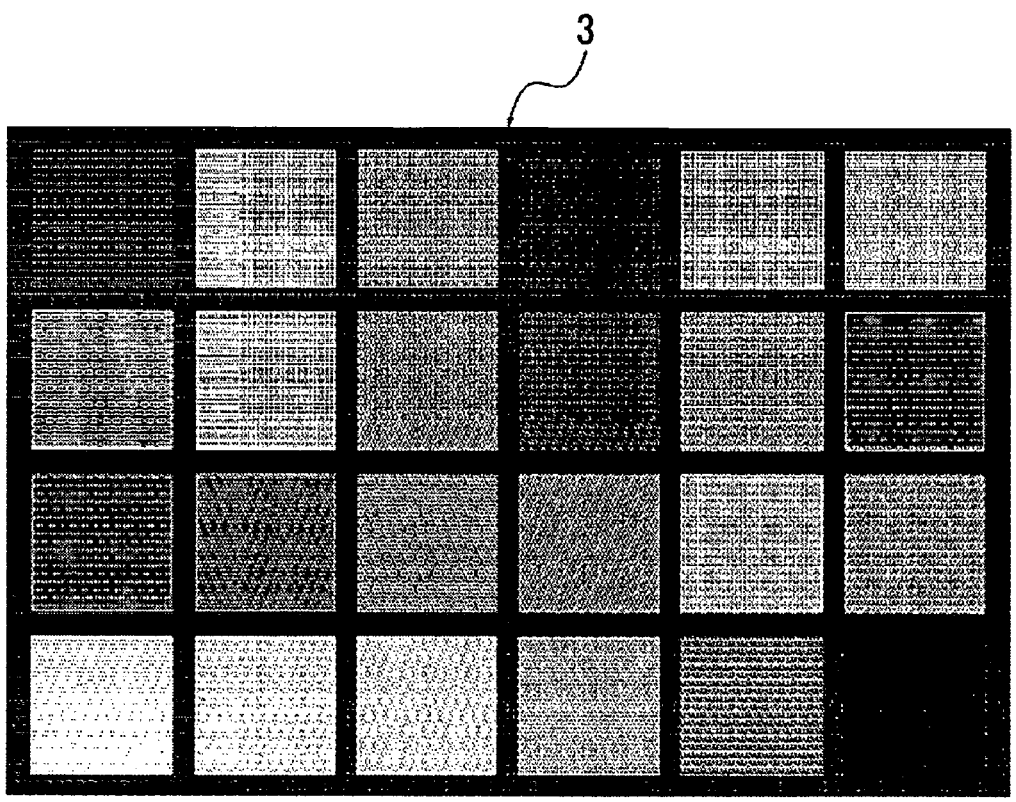
FIG. 2 is a diagram illustrating an example of a color chart.

FIG. 2 illustrates an example of the color chart 3. A chart used in color design, such as the Color Checker for DC (240 colors; manufactured by GretagMacbeth), for example, can be used as the color chart 3.

Figure 3:
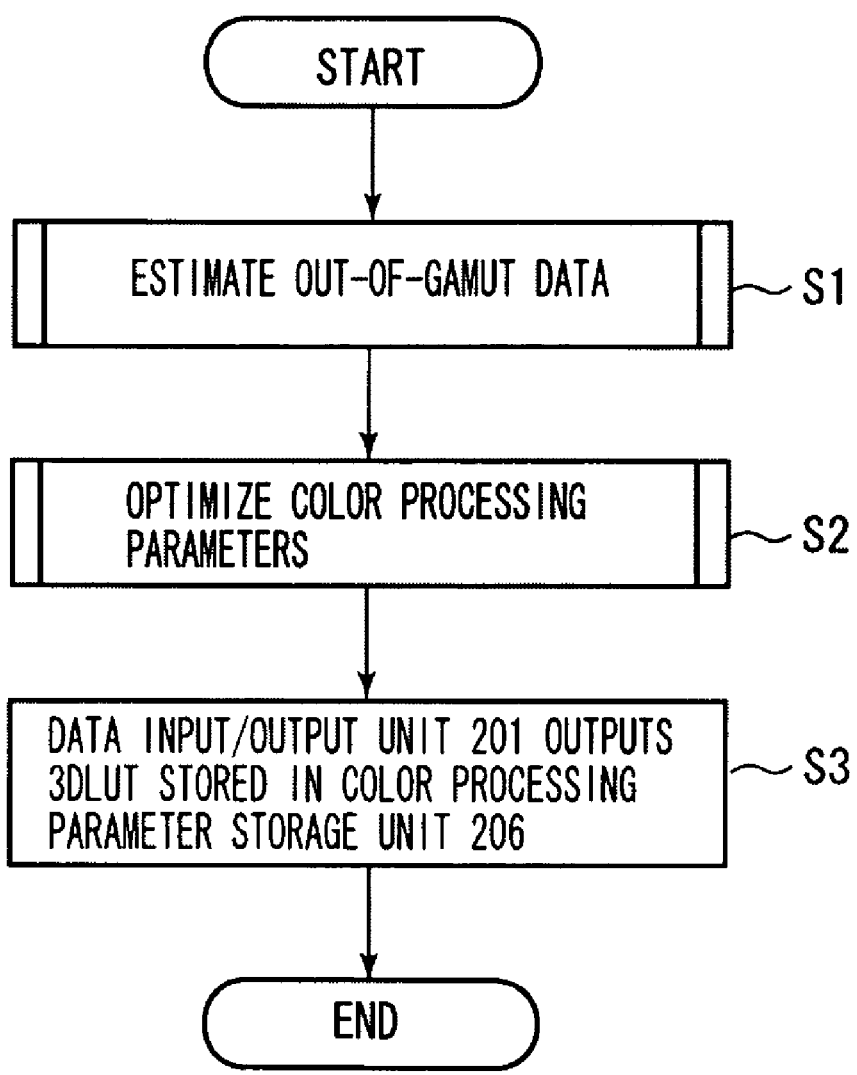
FIG. 3 is a flowchart illustrating processing in a color processing parameter editing apparatus.

FIG. 3 illustrates a flow of processing by the color processing parameter editing apparatus 2.

In step S1, the color processing parameter editing apparatus 2 estimates out-of-gamut data. The operations in step S1 will be described in more detail below using FIGS. 4 to 6. In step S2, the color processing parameter editing apparatus 2 optimizes color processing parameters and generates a three-dimensional look-up table (3DLUT). The operations in step S2 will be described in more detail below using FIG. 7. In step S3, the data input/output unit 201 uploads the 3DLUT generated in step S2, which is stored in the color processing parameter storage unit 206, to the digital camera 1.

Figure 4:
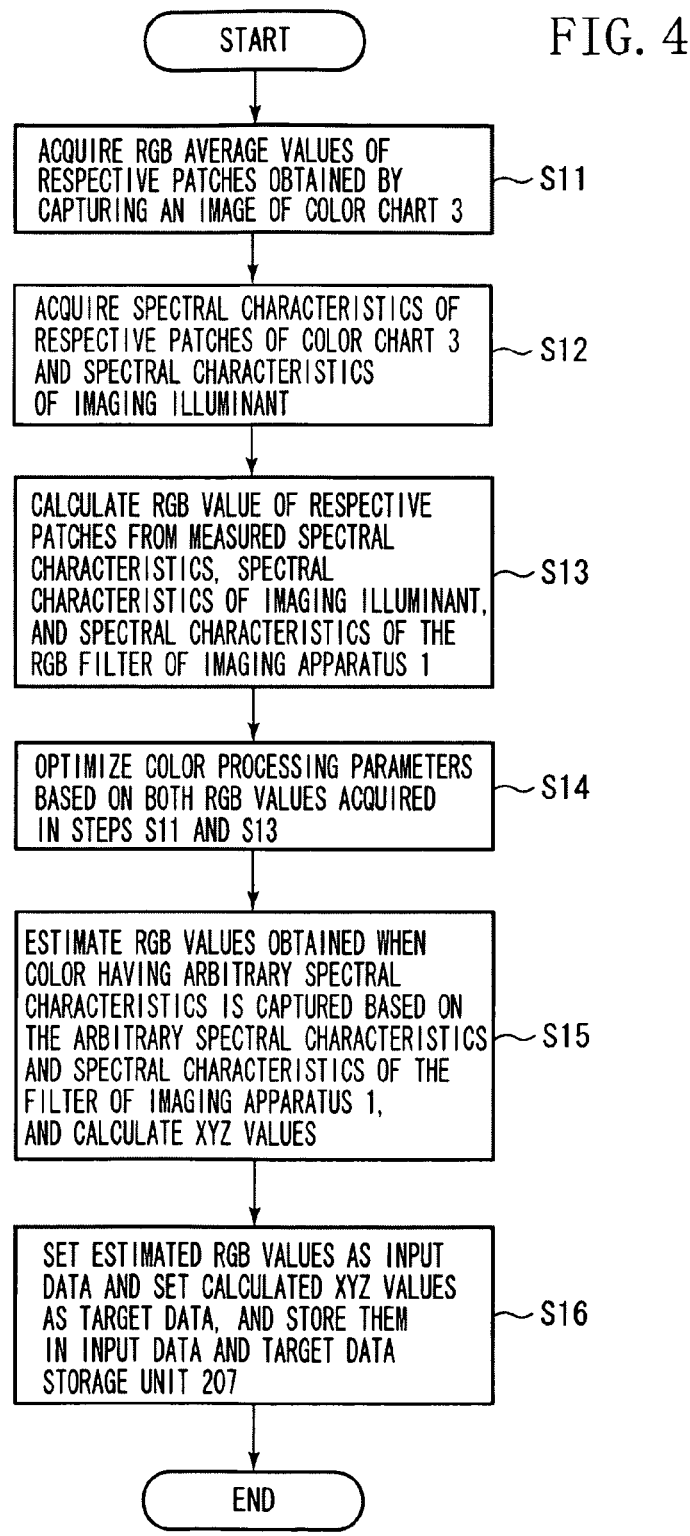
FIG. 4 is a flowchart illustrating estimation processing by an RGB value estimation unit.

FIG. 4 illustrates a flow of processing by the RGB value estimation unit 204. FIG. 4 illustrates step S1 of FIG. 3 in more detail.

In step S11, the RGB value estimation unit 204 acquires RGB average values of respective patches obtained by capturing an image of the color chart 3 using the digital camera 1.

When capturing an image of the color chart 3, the image processing unit 103 uses a parameter for outputting, to the data input/output unit 102, image data acquired from the imaging unit 101 as is. For example, for gamma processing, a gamma value "1" is used, and for matrix processing, a unit matrix is used.

In step S12, the RGB value estimation unit 204 acquires the measured values of spectral characteristics of respective patches of the color chart 3 and spectral characteristics of an imaging illuminant.

Figure 5:
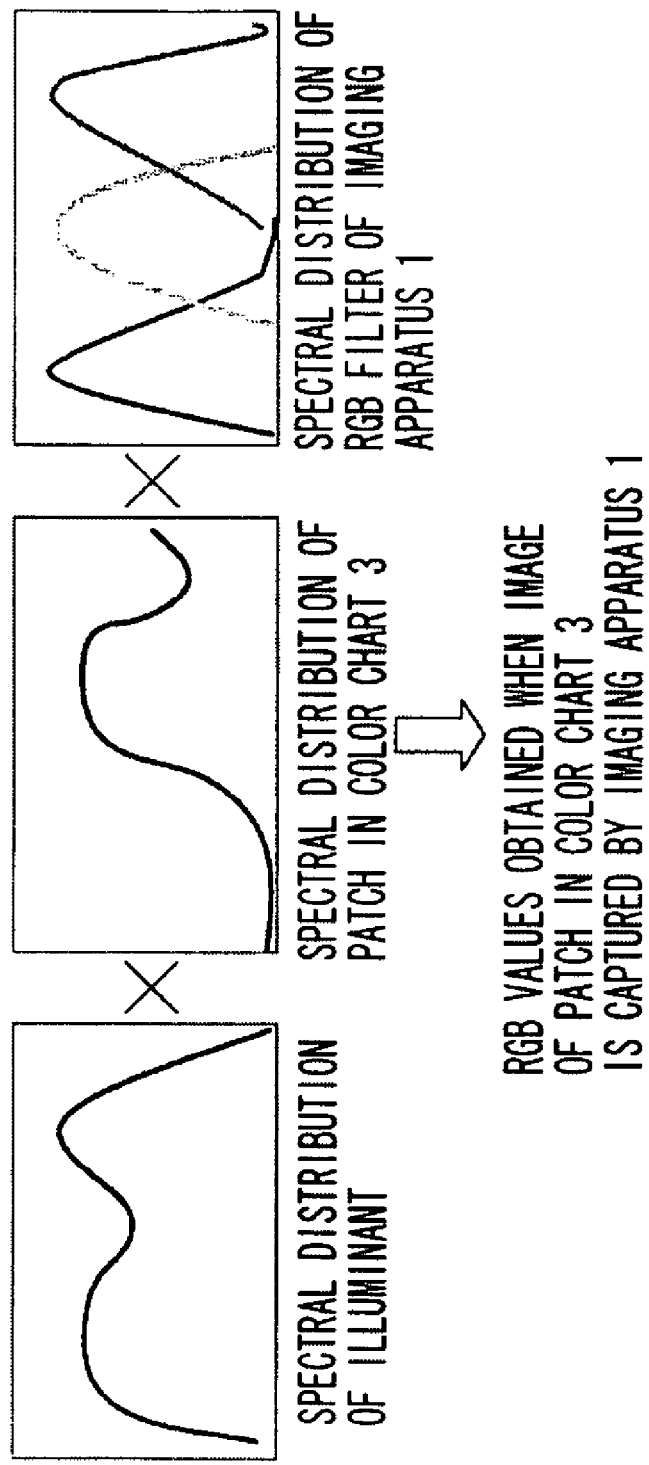
FIG. 5 is a diagram illustrating a method for calculating RGB values from the spectral distribution of an illuminant, the spectral distribution of a patch in a color chart, and the spectral distribution of an RGB filter of an imaging apparatus.

In step S13, the RGB value estimation unit 204 calculates RGB values of respective patches from the spectral characteristics of the respective patches acquired in step S12, the spectral characteristics of the imaging illuminant, and the spectral characteristics of an RGB filter of the imaging apparatus 1. As illustrated in FIG. 5, the RGB value estimation unit 204 determines integral values after multiplying the spectral characteristics of the imaging illuminant, the spectral characteristics of each patch, and the spectral characteristics of the RGB filter of the imaging apparatus 1 together with respect to each wavelength.

In step S14, the RGB value estimation unit 204 optimizes color processing parameters based on the RGB values acquired in S11 and the RGB values calculated in S13. Although the RGB values acquired in step S11 and the RGB values calculated in step S13 are acquired from the same patches, the values are different. The matrix for making up this difference is determined as color processing parameters.

In the optimization, the RGB value estimation unit 204 calculates the RGB data acquired in step S11 using color processing parameters to convert the RGB data into data (L*i, a*i, b*i) in CIELAB with respect to sRGB defined by IEC61966-2-1. A 3×3 matrix, a 3×9 matrix, or a 3×19 matrix is used for the color processing parameters. Further, the RGB value estimation unit 204 converts the RGB data acquired in step S13 into data (L*Ti, a*Ti, b*Ti) in CIELAB with respect to sRGB defined by IEC61966-2-1. Then, the RGB value estimation unit 204 optimizes the color processing parameters using the DLS algorithm such that all color-processed input data (L*i, a*i, b*i) is brought as close as possible to the corresponding target data (L*Ti, a*Ti, b*Ti).

At this point, letting Ei represent an evaluation function of each color patch and E represent the overall evaluation function, the parameters that minimize Equation (1) are calculated.

$$E = \sum_i E_i = \sum_i \sqrt{(L^*_{Ti} - L^*_i)^2 + (a^*_{Ti} - a^*_i)^2 + (b^*_{Ti} - b^*_i)^2} \qquad (1)$$

Further, a weighting can be set individually for each color patch. Letting wi represent a weighting value, then the evaluation function can be expressed as follows:

$$E = \sum_i w_i E_i = \sum_i w_i \sqrt{(L^*_{Ti} - L^*_i)^2 + (a^*_{Ti} - a^*_i)^2 + (b^*_{Ti} - b^*_i)^2} \qquad (2)$$

In step S15, the RGB value estimation unit 204 estimates RGB values obtained when color having arbitrary spectral characteristics is captured based on the arbitrary spectral characteristics and spectral characteristics of the filter of the imaging apparatus 1, and calculates XYZ values.

As a result of the processing up to step S14, the relationship (color processing parameters) between the spectral characteristics of the respective patches of the color chart 3 and the RGB values obtained when an image of the respective patches is captured by the imaging apparatus 1 is determined. Then, the RGB value estimation unit 204 uses this relationship to estimate RGB values obtained when an image of the spectral distribution of a patch that is not included in the color chart 3 is captured by the imaging apparatus 1.

Figure 6:
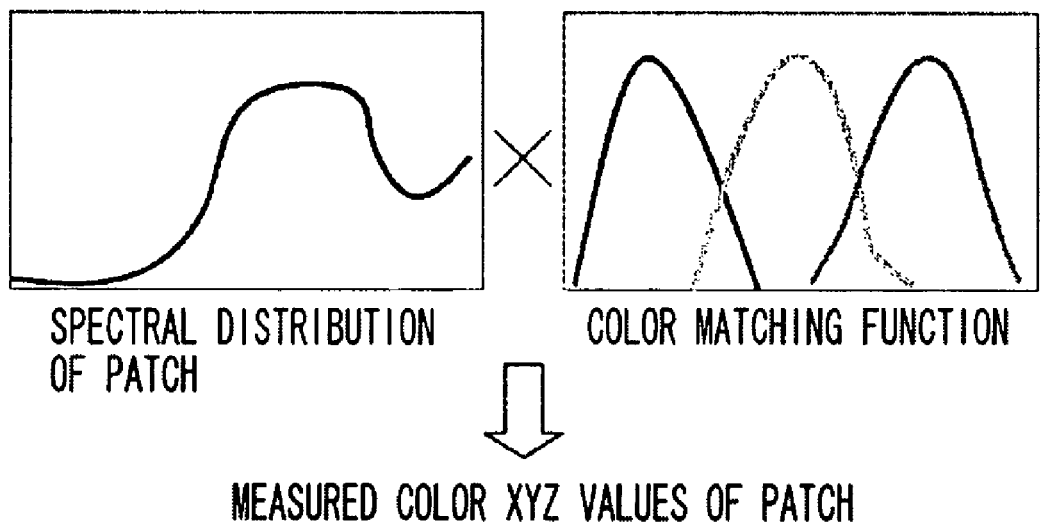
FIG. 6 is a diagram illustrating a method of calculating XYZ values from the spectral distribution of a patch in a color chart and a color matching function.

Further, as illustrated in FIG. 6, the RGB value estimation unit 204 determines XYZ values by multiplying the spectral distribution of a new patch that is not included in the color chart 3 by a color matching function.

Figure 10:
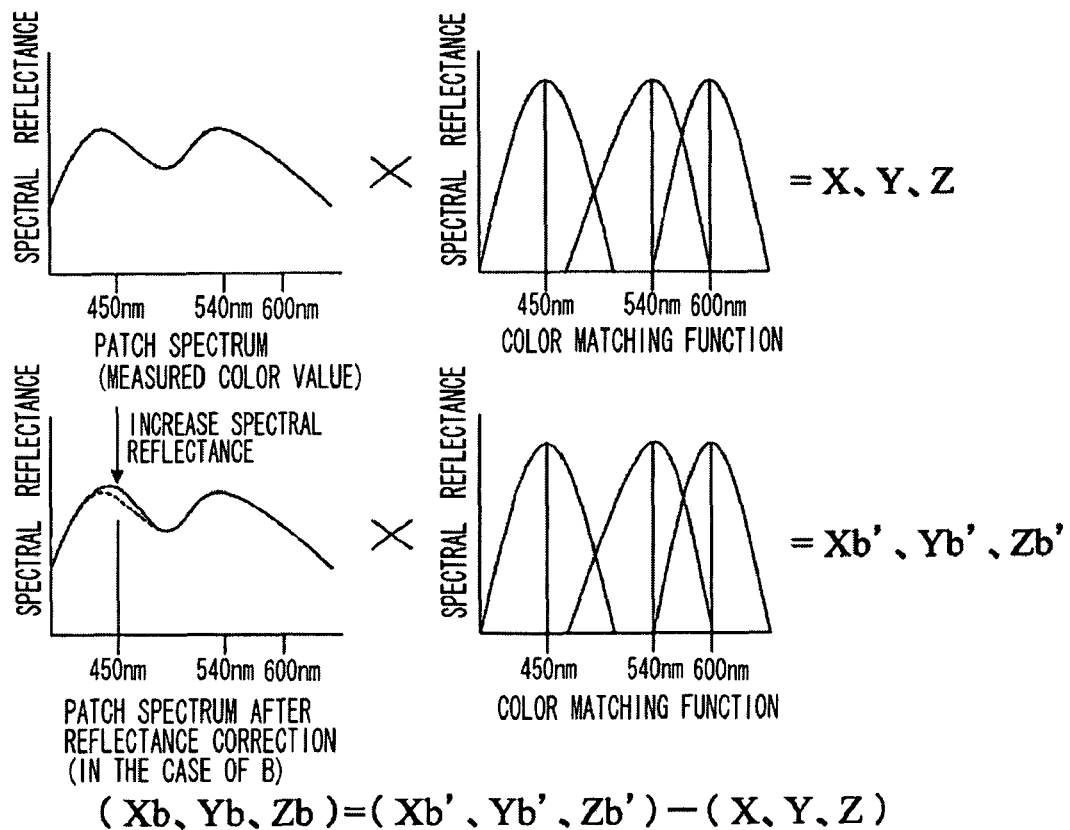
FIG. 10 is a diagram illustrating a method for generating spectral data.

Here, a method for producing the spectral characteristics of a patch that is not included in the color chart 3 will be described. In the production, while the spectral characteristics can be artificially and freely produced, a method will be described with reference to FIG. 10 as one example for producing spectral characteristics from the spectral characteristics of a patch that is included in the color chart 3.

First, the XYZ values desired to be reproduced are set. The XYZ values desired to be reproduced are of a color that falls outside the color gamut of the color chart 3. For example, they can be the XYZ values of a color close to the color gamut boundary of a target color space.

Next, a patch having XYZ values closest to the XYZ values desired to be reproduced (i.e., a patch having the smallest color difference) is selected from among the patches of the color chart 3.

By adjusting the spectral characteristics of the selected patch, the spectral characteristics of the new patch are produced. For example, the value of the spectral characteristics of the selected patch corresponding to the wavelength having the highest spectral reflectance in the RGB color matching function (peak wavelength, 600 nm in R, 540 nm in G, and 450 nm in B) is increased by 0.1. The changed amount itself is made to decrease the further away from the peak wavelength it becomes. The XYZ values of the modified spectral characteristics $Xb'$, $Yb'$ and $Zb'$ are calculated from the adjusted spectral characteristics and the color matching function. Then, the difference (Xb, Yb, Zb) between the values $Xb'$, $Yb'$, $Zb'$ and the XYZ values desired to be reproduced are calculated. The same processing is performed on R and G to calculate (Xr, Yr, Zr) and (Xg, Yg, Zg).

Letting the difference with the XYZ values of the patch selected from the color chart 3 be $\Delta X$, $\Delta Y$, and $\Delta Z$, $\alpha$, $\beta$ and $\gamma$ satisfying the following equation are determined using (Xr, Yr, Zr), (Xg, Yg, Zg), (Xb, Yb, Zb), and the XYZ values desired to be reproduced.

$$\begin{pmatrix} \Delta X \\ \Delta Y \\ \Delta Z \end{pmatrix} = \begin{pmatrix} Xr & Xg & Xb \\ Yr & Yg & Yb \\ Zr & Zg & Zb \end{pmatrix} \begin{pmatrix} \alpha \\ \beta \\ \gamma \end{pmatrix}$$

Here, the calculated $\alpha$, $\beta$ and $\gamma$ are expressed in terms of the rate of change, so that the R, G and B regions of the spectral characteristics of the selected patch are adjusted based on values obtained by multiplying $\alpha$, $\beta$, and $\gamma$ by 0.1.

In the above equation, if $\alpha$, $\beta$, and $\gamma$ cannot be determined (cases where the inverse matrix of a 3×3 matrix does not exist, or where the spectral reflectance after correction of the spectral characteristics is less than 0 or greater than 1), the adjustment of the spectral characteristics of the selected patch is changed and the calculation is performed again. For example, the adjusted wavelength region is changed, and the calculation is performed again.

If the calculation cannot be performed even with this method, the selected patch is changed. At that point, a patch having the second closest XYZ values can be selected. If the calculation still cannot be performed, the Lab values desired to be reproduced are changed.

In step S16, the RGB value estimation unit 204 stores both the determined RGB data and the XYZ values, which are converted into CIELAB with respect to sRGB defined by IEC61966-2-1, in the input data and target data storage unit 207 as a pair of input data and target data.

Figure 7:
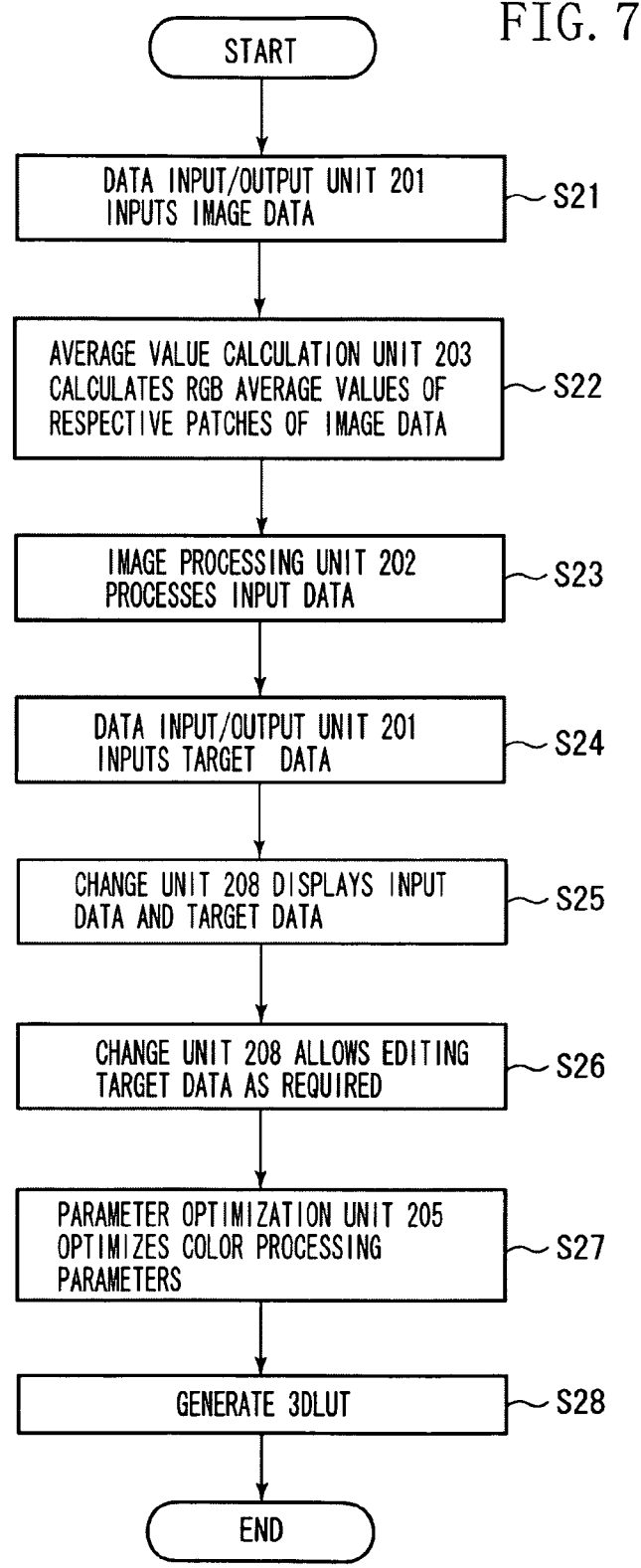
FIG. 7 is a flowchart illustrating processing for color processing parameter optimization.

FIG. 7 illustrates a color processing parameter optimization method. FIG. 7 illustrates step S2 of FIG. 3 in more detail.

In step S21, the data input/output unit 201 inputs image data of the color chart 3. The image data can be read directly from the digital camera 1 via a cable, or can be read from a recording medium, such as CompactFlash®. The input data is a captured image of the color chart 3.

In step S22, the average value calculation unit 203 determines RGB average values of the respective patches of the input image data.

In step S23, the image processing unit 202 performs color processing on the RGB average values using color processing parameters that were set in the color processing parameter storage unit 206 beforehand. Here, a 3×3 matrix, a 3×9 matrix, a 3×19 matrix, or the like is conceivable as the color processing parameters. The matrix generated in step S14 can also be used.

Then, the image processing unit 202 stores the processed RGB data, which is converted into CIELAB with respect to sRGB defined by IEC61966-2-1, in the input data and target data storage unit 207 as input data.

The conversion equation is as follows:

(Conversion Equation for RGB→CIEXYZ)

When $R_{sRGB} \leq 0.04045$  (3)
$R_{liner} = R_{sRGB} / 12.92$
When $R_{sRGB} > 0.04045$
$R_{liner} = ((R_{sRGB} + 0.055)/1.055)^{2.4}$ When $G_{sRGB} \leq 0.04045$  (4)
$G_{liner} = G_{sRGB} / 12.92$
When $G_{sRGB} > 0.04045$
$G_{liner} = ((G_{sRGB} + 0.055)/1.055)^{2.4}$ When $B_{sRGB} \leq 0.04045$  (5)
$B_{liner} = B_{sRGB} / 12.92$
When $B_{sRGB} > 0.04045$
$B_{liner} = ((B_{sRGB} + 0.055)/1.055)^{2.4}$ $$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{liner} \\ G_{liner} \\ B_{liner} \end{pmatrix} \times 100.0 \quad (6)$$

(Conversion Equation for CIEXYZ→CIELAB)

$Xn = 95.045$  (7)
$Yn = 100.000$
$Zn = 108.892$

When $X/Xn > 0.00856$  (8)
$XRate = (X/Xn)^{\frac{1}{3}}$
When $X/Xn \leq 0.00856$
$XRate - 7.787 \times (X/Xn) + 16.0/116.0$ -continued When $Y/Yn > 0.00856$ (9)

$YRate = (Y/Yn)^{\frac{1}{3}}$

When $Y/Yn \leq 0.00856$ $YRate = 7.787 \times (Y/Yn) + 16.0/116.0$

When $Z/Zn > 0.00856$ (10)

$ZRate = (Z/Zn)^{\frac{1}{3}}$

When $Z/Zn \leq 0.00856$ $ZRate = 7.787 \times (Z/Zn) + 16.0/116/0$

When $Y/Yn > 0.00856$ (11)

$L^* = 116.0 \times (Y/Yn)^{\frac{1}{3}} - 16.0$

When $Y/Yn \leq 0.00856$ $L^* = 903.29 \times (Y/Yn)$ $a^* = 500 \times (XRate - YRate)$ (12)
$b^* = 200 \times (YRate - ZRate)$ where Xn, Yn, and Zn are values calculated from the color temperature of the illumination at the time of image capture.

Figure 8:
FIG. 8 is a diagram illustrating an example of text data obtained when input data and target data are read from a text file.

In step S24, the data input/output unit 201 inputs target data corresponding to the respective patches of the color chart 3. The target data is acquired from the input data and target data storage unit 207. Further, the data input/output unit 201 acquires input data and target data of a patch that is not included in the color chart 3 from the input data and target data storage unit 207. FIG. 8 illustrates an example of text data obtained when input data and target data are read from a text file.

Figure 9:
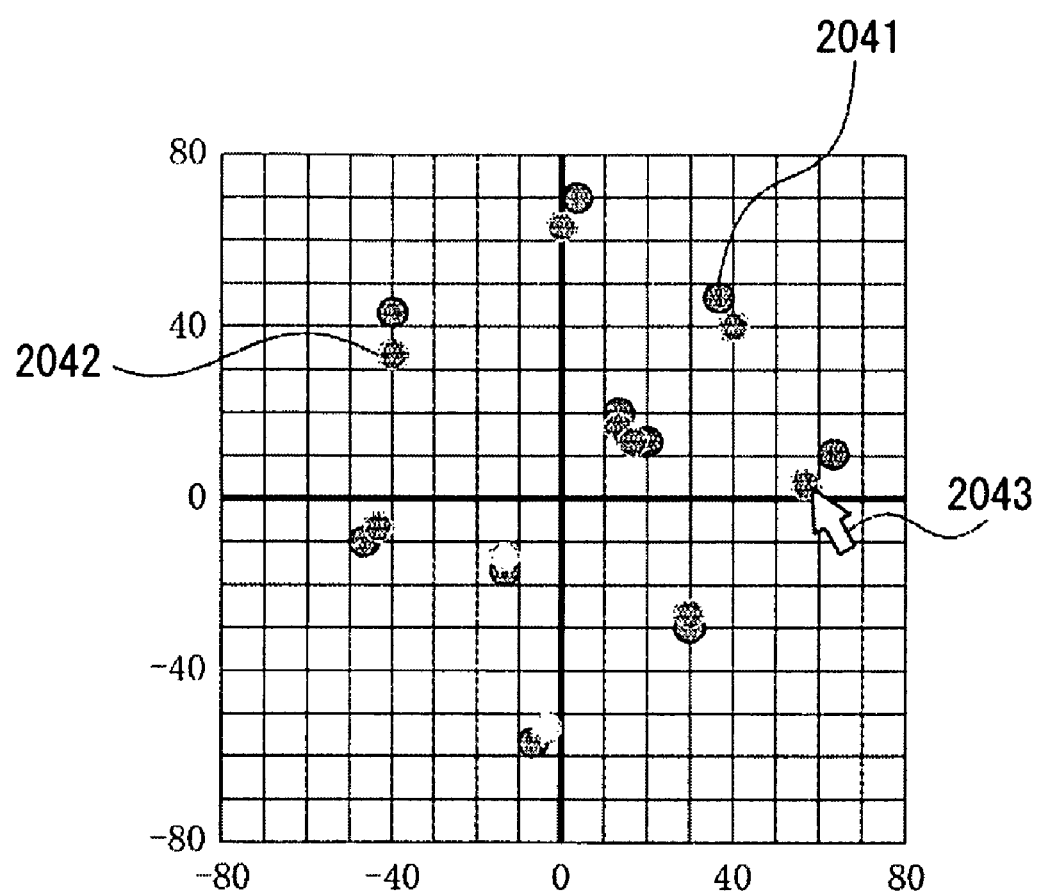
FIG. 9 is a diagram illustrating a display example on a change unit.

In step S25, the change unit 208 displays the input data and target data acquired in step S24. FIG. 9 illustrates an example of the display on the change unit 208. This will be described in more detail below.

In step S26, the change unit 208 allows editing the target data as required. At this time, editing such as strengthening the red hue of skin color or strengthening the blue color of the sky, for example, can be performed.

In step S27, the parameter optimization unit 205 optimizes color processing parameters.

In the optimization, the parameter optimization unit 205 converts each input RGB data into data (L*i, a*i, b*i) in CIELAB with respect to sRGB defined by IEC61966-2-1 and converts each corresponding target data into data (L*Ti, a*Ti, b*Ti).

Then, the parameter optimization unit 205 optimizes the color processing parameters (a 3×3 matrix, a 3×9 matrix, or a 3×19 matrix) using the DLS algorithm such that all color-processed input data is brought as close as possible to the corresponding target data.

At this point, the parameters that minimize the value E defined in the following equation are calculated, where Ei is an evaluation function for each color patch and E is the overall evaluation function.

$$E = \sum_i E_i = \sum_i \sqrt{(L^*_{Ti} - L^*_i)^2 + (a^*_{Ti} - a^*_i)^2 + (b^*_{Ti} - b^*_i)^2} \quad (13)$$

A weight may be individually set for each color patch. In that case, the evaluation function is calculated using the following equation, where wi is a weight value.

$$E = \sum_i w_i E_i = \sum_i w_i \sqrt{(L^*_{Ti} - L^*_i)^2 + (a^*_{Ti} - a^*_i)^2 + (b^*_{Ti} - b^*_i)^2} \quad (14)$$

In step S28, the color processing parameter editing apparatus 2 generates a 3DLUT using the optimized color processing parameters. An example of a generation method is described below in which it is assumed that the input RGB data from the digital camera 1 is ten bits (0 to 1023) and the number of slices of the 3DLUT is 17.

(R, G, B)=
(0, 0, 0), (0, 0, 64), (0, 0, 128), . . . ,
(0, 0, 1023), (0, 64, 0), (0, 64, 64), . . . ,
(0, 64, 1023), (0, 128, 0), (0, 128, 64), . . . , (1023, 1023, 1023).

First, the color processing parameter editing apparatus 2 sequentially inputs the above 4913(=17×17×17) data items. Next, the color processing parameter editing apparatus 2 calculates R'G'B' values using the optimized color processing parameters. Then, the color processing parameter editing apparatus 2 converts the R'G'B' values into L*a*b* values in CIELAB with respect to sRGB defined by IEC61966-2-1.

Then, the color processing parameter editing apparatus 2 stores the calculated 4913 pairs of (R, G, B)-(L*, a*, b*) in the color processing parameter storage unit 206 as a 3DLUT.

Now, description will be given of the method for calculating the R'G'B' values in step S28.

The color processing parameter can be, for example, a 3×3 matrix, a 3×9 matrix, or a 3×19 matrix. The R'G'B' values are calculated according to any one of the following equations.

First, the input RGB values are normalized. If the input RGB values are ten bits, the normalization is performed by dividing each value by 1023(=$2^{10}$−1). Next, any one of the following equations (15) to (17) is used to calculate the R'G'B' values.

$$\begin{pmatrix} R' \\ G' \\ B' \end{pmatrix} = M1 \begin{pmatrix} R \\ G \\ B \end{pmatrix} \quad (15)$$

$$\begin{pmatrix} R' \\ G' \\ B' \end{pmatrix} = M2 \begin{pmatrix} R \\ G \\ B \\ RR \\ RG \\ RB \\ GG \\ GB \\ BB \end{pmatrix} \quad (16)$$

$$\begin{pmatrix} R' \\ G' \\ B' \end{pmatrix} = M3 \begin{pmatrix} R \\ G \\ B \\ RR \\ RG \\ RB \\ GG \\ GB \\ BB \\ RRR \\ RRG \\ RRB \\ RGG \\ RGB \\ RBB \\ GGG \\ GGB \\ GBB \\ BBB \end{pmatrix} \quad (17)$$

where M1 is a 3×3 matrix, M2 is a 3×9 matrix, and M3 is a 3×19 matrix.

FIG. 9 illustrates an example of the display on the change unit 208.

On the change unit 208, input data (black-edged point) 2041 of each patch and target data (white-edged point) 2042 are displayed. The data is mapped on the a*b* plane, the L*a* plane, or the L*b* plane of a space defined by CIELAB.

If the target data is set so that it can be changed via a pointer 2043, the target data can be visually changed on the screen.

It is noted that the exchange of data between the digital camera 1 and the color processing parameter editing unit 2 can be performed using a recording medium, such as CompactFlash®.

Further, although the equation (1) or (2) is used as the evaluation function, $\Delta E_{94}$ represented by the following equations can also be used.

$$E_1 = \Delta E_{94} = \sqrt{\Delta L^{*2} + \left(\frac{\Delta C^*}{1+0.045 C_1}\right)^2 + \left(\frac{\Delta H^*}{1+0.015 C_1}\right)^2} \quad (18)$$

$$E_1 = Wi\Delta E_{94} = Wi\sqrt{\Delta L^{*2} + \left(\frac{\Delta C^*}{1+0.045 C_1}\right)^2 + \left(\frac{\Delta H^*}{1+0.015 C_1}\right)^2} \quad (19)$$

$$\begin{cases} \Delta L^* = L^*_{Ti} - L^*_i \\ \Delta C^* = \sqrt{a^{*2}_{Ti} + b^{*2}_{Ti}} - \sqrt{a^{*2}_i + b^{*2}_i} \\ \Delta H = \sqrt{\Delta E^2 - \Delta L^{*2} - \Delta C^{*2}} \\ C_1 = \sqrt{a^{*2}_{Ti} + b^{*2}_{Ti}} \end{cases}$$

wherein Wi is a weight value for each patch.

In the above-described exemplary embodiment, in step S1 of FIG. 3, out-of-gamut data of the color chart 3 is estimated. However, data other than a patch included in the color chart 3 can also be estimated. For example, data of a color that is desired to be accurately reproduced (a special skin color or the color of a logo etc.) can also be estimated. Specifically, when a patch of the desired color cannot be prepared, performing an estimation using the method of the above-described exemplary embodiment enables the accuracy of the color reproduction to be increased even if there is no patch.

Further, in the above-described exemplary embodiment, the various above-described devices can be activated according to a program stored in a computer (central processing unit (CPU) or micro processing unit (MPU)). In such a case, the code (e.g., software program) for realizing the functions of the above-described exemplary embodiment is supplied to a computer in an apparatus or a system connected to the various above-described devices so as to activate the devices so that the functions of the color processing parameter editing apparatus are realized.

For example, driver software installed in a computer can be used to perform the image processing. Further, in this case, the code of the above-described software program itself realizes the functions of the above-described exemplary embodiment. The code itself may be stored on a computer-readable storage medium which supplies the code to a computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-140565 filed May 28, 2007, which is hereby incorporated by reference herein in its entirety.

What is claimed is:

1. A method for generating a color processing parameter used in color processing performed on an image captured by an imaging unit, the method comprising:

inputting data of an image captured by the imaging unit;

inputting target data corresponding to the data;

generating a pair of data and target data based on the data and the target data; and generating a color processing parameter for converting the data into the target data.

2. The method according to claim 1, further comprising generating the color processing parameter such that a difference between data obtained by processing the data with the generated color processing parameter and the target data decreases.

3. The method according to claim 1, further comprising:

calculating a new color processing parameter based on data calculated from a spectral characteristic of the input data, a spectral characteristic of an illuminant during image capture, and a spectral characteristic of a filter of the imaging unit; and generating a new pair of data and target data corresponding to an arbitrary spectral characteristic using the calculated color processing parameter, the spectral characteristic of the input data, the spectral characteristic of the illuminant during image capture, and the spectral characteristic of the filter of the imaging unit.

4. The method according to claim 3, wherein the filter of the imaging unit includes an R, G, B filter.

5. A non-transitory computer-readable storage medium storing computer-executable instructions which, when executed by an apparatus, cause the apparatus to perform the method according to claim 1.

6. A color processing apparatus configured to generate a color processing parameter used in color processing performed on an image captured by an imaging unit, the color processing apparatus comprising:

a data input unit configured to input data of an image captured by the imaging unit;

a target input unit configured to input target data corresponding to the data;

a generation unit configured to generate a pair of data and target data based on the data and the target data; and a color processing parameter generation unit configured to generate a color processing parameter for converting the data to the target data.

* * * * *